US009473709B2

(12) United States Patent
Lu

(10) Patent No.: US 9,473,709 B2
(45) Date of Patent: Oct. 18, 2016

(54) IMAGE BLENDING SYSTEM AND METHOD FOR IMAGE BLENDING

(71) Applicant: Yi-Chun Lu, New Taipei (TW)

(72) Inventor: Yi-Chun Lu, New Taipei (TW)

(73) Assignee: Optoma Corporation, New Taipei (TW)

( * ) Notice: Subject to any disclaimer, the term of this patent is extended or adjusted under 35 U.S.C. 154(b) by 96 days.

(21) Appl. No.: 14/489,485

(22) Filed: Sep. 18, 2014

(65) Prior Publication Data

US 2016/0088233 A1  Mar. 24, 2016

(51) Int. Cl.
*H04N 5/265* (2006.01)
*H04N 9/31* (2006.01)
*G03B 37/04* (2006.01)

(52) U.S. Cl.
CPC .............. *H04N 5/265* (2013.01); *G03B 37/04* (2013.01); *H04N 9/3147* (2013.01); *H04N 9/3182* (2013.01); *H04N 9/3185* (2013.01)

(58) Field of Classification Search
CPC ............. H04N 9/3147; H04N 9/3185; H04N 9/3197; G06T 5/00; G06T 5/006; G06T 5/50; G03B 37/04
See application file for complete search history.

(56) References Cited

U.S. PATENT DOCUMENTS

| 6,456,339 | B1 | 9/2002 | Surati et al. | |
| 2002/0008697 | A1* | 1/2002 | Deering | G06T 5/006 345/418 |
| 2003/0156262 | A1* | 8/2003 | Baker | H04N 9/3147 353/31 |
| 2010/0111441 | A1* | 5/2010 | Xiong | G06T 5/00 382/275 |
| 2011/0007172 | A1* | 1/2011 | Miceli | H04N 9/3147 348/222.1 |
| 2013/0027332 | A1 | 1/2013 | Yang et al. | |
| 2013/0169888 | A1* | 7/2013 | Tannhauser | H04N 9/3188 348/745 |

* cited by examiner

*Primary Examiner* — Sultan Chowdhury
(74) *Attorney, Agent, or Firm* — Jianq Chyun IP Office

(57) ABSTRACT

An image blending system and a method for image blending are provided. The image blending system includes a plurality of projection devices, an image capturing device, a blending device, a video input module, and a computing module. The projection devices project a desired image. The image capturing device is configured for image capturing from a projection surface. The captured image has an image capturing coordinate system based on a resolution of the captured image. The projection devices receive an input video signal transmitted from the blending device for projection, and the input video signal has an input video coordinate system based on a resolution of the input video signal. The computing module calculates for obtaining a plurality of mapping relationships according to the image capturing coordinate system and the input video coordinate system, and obtaining an image blending relationship through the mapping relationships and an overlapping area of projection regions.

20 Claims, 4 Drawing Sheets

US 9,473,709 B2

IMAGE BLENDING SYSTEM AND METHOD FOR IMAGE BLENDING

BACKGROUND OF THE INVENTION

1. Field of the Invention

The invention is directed to projection technique, and more particularly to an image blending system having a plurality of projection devices and a method for image blending.

2. Description of Related Art

Since the manufacture of a large size display still poses many difficult challenges, when sharing a large size image with an audience is required to fulfill audio-visual effects, a plurality of projection devices and a main control machine can be used to implement image blending, so as to project the content to be shared. In this way, a wide screen effect is presented, and to enhance the performance of the projection by increasing the number of the projection devices is needed. Disclosures related to a screen blending technology implemented through a plurality of projectors include U.S. Pat. No. 6,456,339 and U.S. Patent Publication No. US 20130027332.

The user desires automatic blending of images implemented using computer equipment through cameras and multiple projectors. However, conventional screen blending technologies implemented through multiple projectors frequently do not accurately perform blending in the overlapping areas of the projection regions of the projector, and consequently, the overlapped portion of the projected images is misaligned or blurred. Therefore, many manufacturers are determined to resolve the problems in image blending in order to improve the image blending technology of multiple projectors.

SUMMARY OF THE INVENTION

Accordingly, the invention is directed to an image blending system and a method for image blending. The image blending system may control a plurality of projectors to perform automatic projection image blending through the images captured by the image capturing device and the resolution information of the input image. Accordingly, the projected images of the overlapping area may be accurately blended.

Other objects and advantages of the invention may be further illustrated by the technical features broadly embodied and described as follows.

In order to achieve one or a portion of or all of the objects or other objects, an embodiment of the invention provides an image blending system including a plurality of projection devices, an image capturing device, a blending device, a video input module, and a computing module. The projection devices are configured to project a desired image, and respectively configured for projection at a plurality of projection regions onto a projection surface, wherein the projection regions are partially overlapped to each other. The image capturing device is configured for image capturing from the projection surface. The captured image from image capturing has an image capturing coordinate system based on a resolution of the captured image. The blending device is coupled to the projection devices. The video input module is configured to transmit an input video signal corresponding to the desired image to the blending device, wherein the projection devices receive the input video signal transmitted from the blending device for projection, and the input video signal has an input video coordinate system based on a resolution of the input video signal. The computing module is configured to calculate for obtaining a plurality of mapping relationships according to the image capturing coordinate system and the input video coordinate system, and for further obtaining an image blending relationship through the mapping relationships and an overlapping area of the projection regions.

In an embodiment of the invention, each of the projection devices is respectively configured to project a desired sub-image at the corresponding projection region according to the image blending relationship, and the desired sub-images are blended into the desired image.

In an embodiment of the invention, the image blending relationship has a first image blending relationship and a second image blending relationship, the first image blending relationship is obtained through the mapping relationships and the input video signal, and the second image blending relationship is obtained through the first image blending relationship.

In an embodiment of the invention, the image blending relationship has a first image blending relationship and a second image blending relationship, and at least one of the first image blending relationship and the second image blending relationship is obtained through the overlapping area of the projection regions.

In an embodiment of the invention, each of the projection devices respectively and sequentially projects at least one first default pattern in the corresponding projection region on the projection surface. The image capturing device captures the first default patterns respectively projected from the projection devices to obtain a plurality of first captured images corresponding to the first default patterns.

In an embodiment of the invention, the computing module calculates a relationship between the image capturing coordinate system and the input video coordinate system through the first default patterns and the first captured images to obtain the mapping relationships. The mapping relationships are respectively related to the projection devices.

In an embodiment of the invention, the blending device receives the image blending relationship transmitted from the computing module.

In an embodiment of the invention, the computing module calculates to obtain the overlapping area of the projection regions. Each of the projection devices respectively and sequentially projects at least one second default pattern in the overlapping area according to the first image blending relationship. The image capturing device captures the second default patterns respectively projected from the projection devices to obtain a plurality of second captured images corresponding to the second default patterns.

In an embodiment of the invention, the computing module calculates a relationship between the second captured images in the overlapping area to generate the second image blending relationship, and transmits the second image blending relationship to the blending device. The projection devices respectively projects a plurality of desired sub-images according to the second image blending relationship transmitted from the blending device, and the desired sub-images are blended into the desired image.

In an embodiment of the invention, the computing module includes a control interface. The control interface is configured to set the resolution of the input video signal and location of each of the projection regions.

In an embodiment of the invention, the computing module is further configured to calculate for obtaining overlapping brightness information corresponding to the overlapping area through the captured image, and the projection devices are further configured to project the desired image having uniform brightness through the overlapping brightness information.

An embodiment of the invention provides a method for image blending adapted to a plurality of projection devices for projecting a desired image at a plurality of projection regions on a projection surface, an image capturing device for image capturing from the projection surface, and a blending device for receiving an input video signal corresponding to the desired image. The method includes following steps: calculating for obtaining a plurality of mapping relationships according to an image capturing coordinate system and an input video coordinate system by a computing module, wherein the input video signal corresponding to the desired image has the input video coordinate system based on a resolution of the input video signal, and a captured image from image capturing has the image capturing coordinate system based on a resolution of the captured image; calculating for obtaining an image blending relationship through the mapping relationships and an overlapping area of the projection regions by the computing module.

In an embodiment of the invention, the method for image blending further includes the following step: respectively projecting, by each of the projection devices, a desired sub-image at the corresponding projection region according to the image blending relationship, wherein the desired sub-images are blended into the desired image.

In an embodiment of the invention, the image blending relationship has a first image blending relationship and a second image blending relationship, the first image blending relationship is obtained through the mapping relationships and the input video signal, and the second image blending relationship is obtained through the first image blending relationship.

In an embodiment of the invention, the image blending relationship has a first image blending relationship and a second image blending relationship, and at least one of the first image blending relationship and the second image blending relationship is obtained through the overlapping area of the projection regions.

In an embodiment of the invention, the step of obtaining the mapping relationships includes the following step: respectively and sequentially projecting, by each of the projection devices, at least one first default pattern in the corresponding projection region on the projection surface; capturing, by the image capturing device, the first default patterns respectively projected from the projection devices to obtain a plurality of first captured images corresponding to the first default patterns.

In an embodiment of the invention, the step of obtaining the mapping relationships further includes the following step: calculating, by the computing module, a relationship between the image capturing coordinate system and the input video coordinate system through the first default patterns and the first captured images to obtain the mapping relationships, wherein the mapping relationships are respectively related to the projection devices.

In an embodiment of the invention, the step of obtaining the image blending relationship through the mapping relationships and the overlapping area of the projection regions includes the following step: calculating, by the computing module, to obtain the overlapping area of the projection regions; respectively and sequentially projecting, by each of the projection devices, at least one second default pattern in the overlapping area according to the first image blending relationship; capturing, by the image capturing device, the second default patterns respectively projected from the projection devices to obtain a plurality of second captured images corresponding to the second default patterns.

In an embodiment of the invention, the step of obtaining the image blending relationship through the mapping relationships and the overlapping area of the projection regions further includes the following step: calculating, by the computing module, a relationship between the second captured images in the overlapping area to generate the second image blending relationship.

In an embodiment of the invention, the method for image blending further includes the following step: respectively projecting, by the projection devices, a plurality of desired sub-images according to the second image blending relationship, wherein the desired sub-images are blended into the desired image.

In an embodiment of the invention, the step of obtaining the input video signal includes the following step: setting the resolution of the input video signal and location of each of the projection regions by a control interface.

In an embodiment of the invention, the method for image blending further includes the following step: calculating, by the computing module, for obtaining overlapping brightness information corresponding to the overlapping area through the captured image; projecting, by the projection devices, the desired image having uniform brightness through the overlapping brightness information.

In an embodiment of the invention, the method for image blending

In summary, the image blending system and the image blending method in the embodiments of the invention may calculate and generate the image blending relationship through the image capturing coordinate system of the images captured by the camera and the input video coordinate system corresponding to the resolution of the input video signal. The image blending relationship is used to project the dired image corresponding to the input video signal through multiple projectors. In some embodiment, the image blending system may also perform image blending correction by projecting default patterns in the overlapping area of the projection regions, so that the projected images of the overlapping area may be accurately blended.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
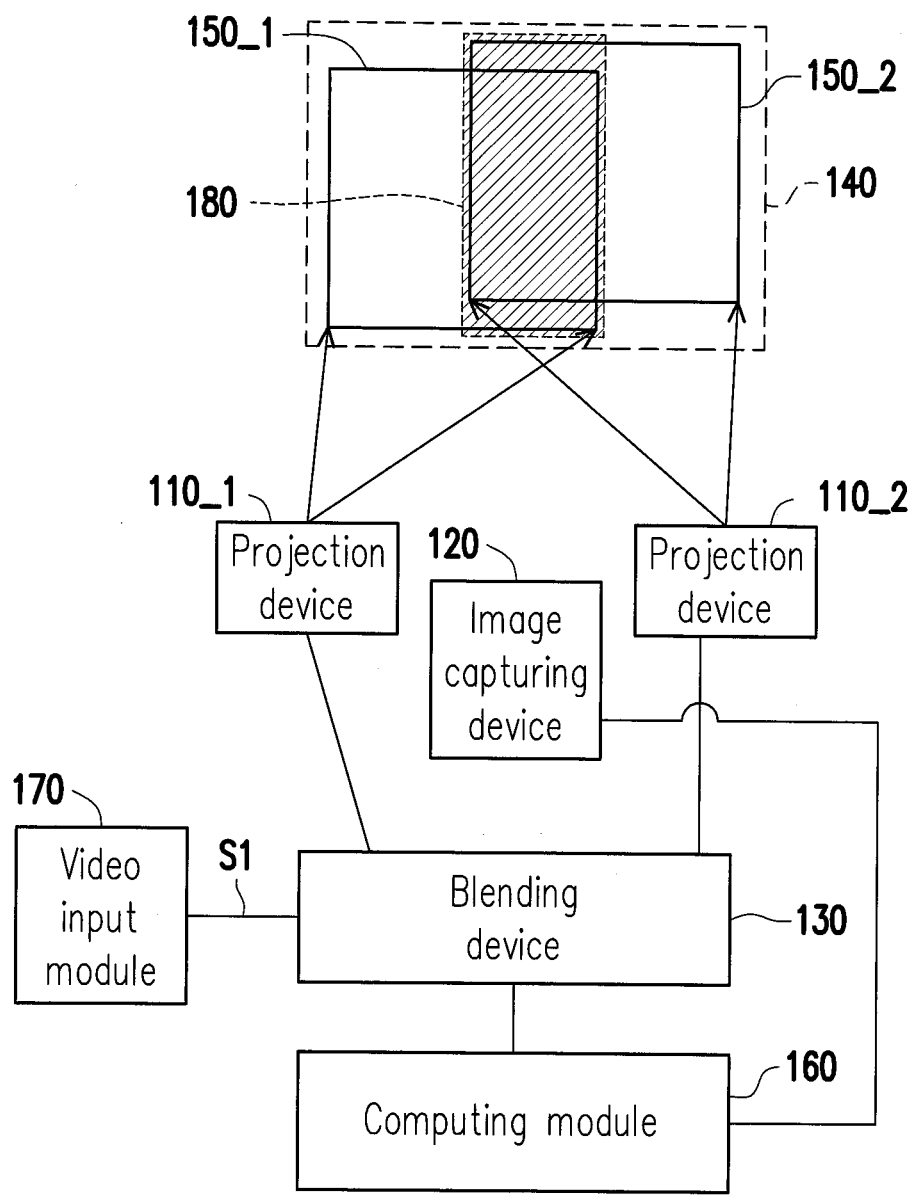
FIG. 1 is a schematic system view of an image blending system according to an embodiment of the invention.

FIG. 1 is a schematic system view of an image blending system 100 according to an embodiment of the invention. With reference to FIG. 1, the image blending system 100 of the embodiment includes a plurality of projection devices (e.g. projection devices 110_1 and 110_2), an image capturing device 120, a blending device 130, a computing module 160, and a video input module 170. The projection devices 110_1 and 110_2 may be devices capable of image projection, such as optical projectors or digital projectors. Each of the projection devices respectively project an image at a corresponding projection region onto a projection surface 140. For example, the projection device 110_1 depicted in FIG. 1 is configured to project an image at a projection region 150_1 onto the projection surface 140, and the projection device 110_2 is configured to project an image at a projection region 150_2 onto the projection surface 140. After employing a method for image blending according to an embodiment of the invention, the projection regions 150_1-150-2 of the projection devices 110_1-110_2 may project a desired image corresponding to an input video signal. It should be noted that, although the embodiment is depicted using an image blending system including two projection devices, but in accordance with the actual requirements needed, one skilled in the art may adjust the quantity of the projection devices to more than two with reference to the embodiment.

In the embodiment, the image capturing device 120 is coupled to the computing module 160. The image capturing device 120 may be a device capable of capturing image information such as a video camera, a camera, or a webcam. The image capturing device 120 is configured for image capturing from the projection surface 140 through capturing an image on the projection surface 140, wherein the captured image is formed by combining the videos respectively projected on the projection region 150_1 and the projection region 150_2. In the embodiment, the image captured by the image capturing device 120 (i.e. the captured image from image capturing) has an image capturing coordinate system based on a resolution of the captured image. For example, the resolution of the image captured by the image capturing device 120 may be 1024*768. The skilled artisan applying the embodiment may freely configure the image resolution of the captured image according to the resolution of the image capturing device 120.

In the embodiment, the blending device 130 is coupled to the projection devices 110_1 and 110_2 and the computing module 160. The blending device 130 is configured to perform image warping or blending on an input video signal S1 transmitted from the video input module 170. In the embodiment, the blending device 130 has a mapping lookup table for inputting videos to each of the projectors, and the blending device 130 is configured to perform signal processing on the input video signal S1 and generate a plurality of sub-video signals respectively provided to the corresponding projection devices 110_1-110_2 for image projection.

In the embodiment, the computing module 160 is coupled to and controls the image capturing device 120 and the blending device 130. The computing module 160 may be one or a combination of a central processing unit (CPU), a micro-processor/controller, a programmable general-purpose microprocessor, specific-purpose microprocessor, a digital signal processor (DSP), analog signal processor, a programmable controller, application specific integrated circuits (ASIC), a programmable logic device (PLD), an image processor, graphics processing unit (GPU), or any other similar device, but the invention is not limited herein. In other embodiments, the computing module 160 may be processing software, such as signal processing software, digital signal processing software (DSP software), analog signal processing software, image processing software, graphics processing software, audio processing software, but the invention is not limited herein.

In some embodiments, the blending device 130 and the computing module 160 may be integrated in a same hardware equipment, although the invention is not limited herein.

The video input module 170 may be one of a combination of a computer, a DVD player, a media storage device, a mobile device, or any other similar device, but the invention is not limited herein. The type of input video signal S1 generated by the video input module 170 may be an analog or a digital signal, such as RGB signal, HDMI signal, or video signal. In some embodiments, the computing module 160 may also control the video input module 170, such that the input video signal S1 may also be controlled or adjusted by the computing module 160. Furthermore, in other embodiments, the video input module 170 and the computing module 160 may be integrated in a same hardware equipment, although the invention is not limited herein.

The projection devices 110_1-110_2 receive the input video signal S1 from the blending device 130 for projection. In the embodiment, the input video signal S1 has an input video coordinate system based on a resolution of the input video signal S1. For instance, the resolution of the input video signal S1 may be 1000*1000.

Figure 2:
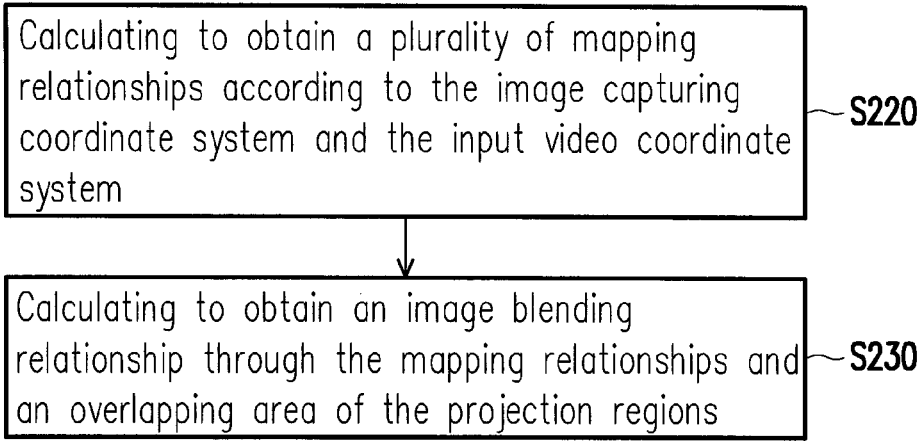
FIG. 2 is a flow diagram of a method for image blending according to an embodiment of the invention.

FIG. 2 is a flow diagram of a method for image blending according to an embodiment of the invention. Referring to FIG. 2, the computing module may firstly calculate to obtain a plurality of mapping relationships according to the image capturing coordinate system and the input video coordinate system (Step S220), and the computing module may then calculate to obtain an image blending relationship through the mapping relationships and an overlapping area of the projection regions (Step S230).

To be more specific, the image blending method may be implemented by the image blending system 100 depicted in FIG. 1. Referring to both FIG. 1 and FIG. 2, the disclosure hereafter references each element in the image blending system 100 to describe each step in the image blending method, for example. In Step S220, the computing module 160 calculates to obtain a plurality of mapping relationships according to the image capturing coordinate system and the input video coordinate system. In one embodiment, the computing module 160 may obtain an input video signal S1 corresponding to a desired image by using the blending device 130. In some embodiment, the computing module 160 may automatically obtain an input video coordinate system based on a resolution of the input video signal S1 by using a detection mechanism. On the other hand, the computing module 160 may also automatically obtain an image capturing coordinate system of the image capturing device 120 based on a resolution of the captured image by using a detection mechanism.

However, in another embodiment in the spirit of the invention, the computing module 160 may include a control interface, and the control interface may allow the user to manually configure the resolution of the input video signal S1 or/and the resolution set of the image capturing device 120, so as to obtain the input video coordinate system corresponding to the input video signal S1 or/and the image capturing coordinate system corresponding to the captured image. Moreover, the user may use the control interface of the computing module 160 to configure the peripheral locations of the projection regions 150_1-150_2 corresponding to each of the projection devices 110_1-110_2 on the projection surface 140, so as to achieve a function allowing the user to define each of the projection regions.

Figure 3:
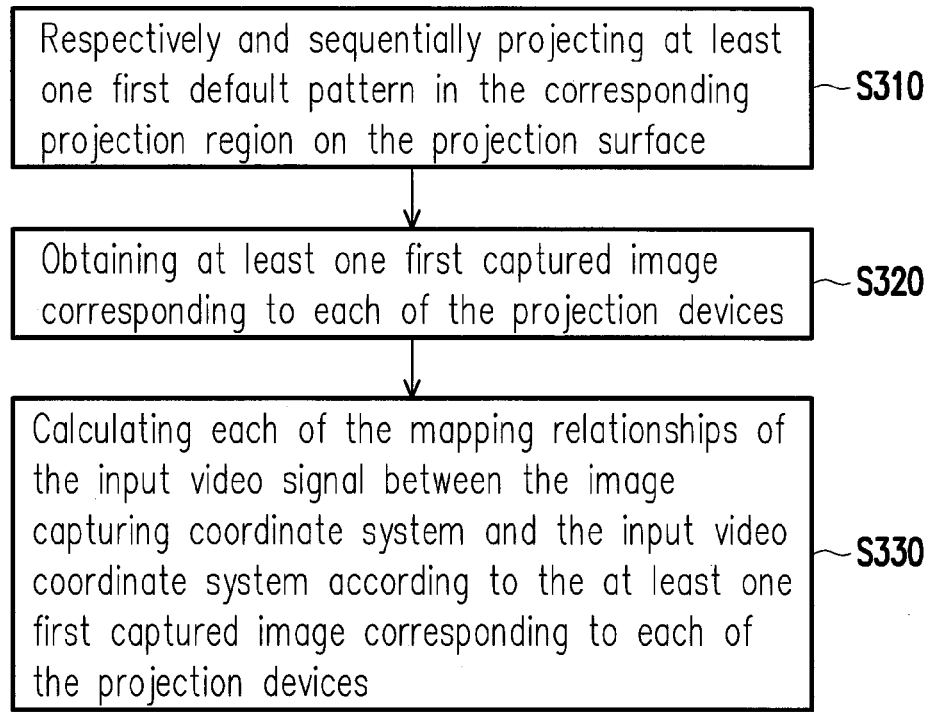
FIG. 3 is a detailed flow diagram of Step S220 in FIG. 2.

Besides, in the embodiment, Step S220 may include the steps depicted in FIG. 3. FIG. 3 is a detailed flow diagram of Step S220 in FIG. 2. With reference to FIG. 1 and FIG. 3, in Step S310, the computing module 160 sequentially controls each of the projection devices 110_1-110_2 through the blending device 130, so that each of the projection devices 110_1-110_2 respectively and sequentially projects at least one first default pattern in the corresponding projection region (i.e. 150_1/150_2) on the projection surface 140.

Afterwards, when the controlled projection device is projecting the first default pattern, the computing module 160 obtains a first captured image corresponding to the controlled projection device (Step S320) from the image capturing device 120. And thus the computing module 160 may obtain a mapping relationship by calculating a relationship between the image capturing coordinate system and the input video coordinate system (Step S330) through the first default pattern and the first captured image corresponding to the controlled projection device. For example, if the computing module 160 controls the projection device 110_1 on the left side to project the first default pattern to the projection region 150_1 in Step S310, then the computing module 160 may obtain a left mapping relationship HL corresponding to the projection device 110_1 in Step S330; if the computing module 160 controls the projection device 110_2 on the right side to project the first default pattern to the projection region 150_2 in Step S310, then the computing module 160 may obtain a right mapping relationship HR corresponding to the projection device 110_2 in Step S330.

It should be noted that, in order to enhance the accuracy of the mapping relationships, the computing module 160 may also repeatedly or iteratively execute Steps S310-S330 on each of the projection devices through a plurality of first default patterns, so as to obtain more accurate mapping relationships HL and HR, wherein each first default pattern may be different from other first default patterns. For example, the computing module 160 may use three different sets of first default patterns to repeatedly execute Steps S310-S330 three times, that is, a kind of first default pattern is used for one execution of Steps S310-S330 and the other two kinds of the default patterns are used for other two executions of Steps S310-S330. In the embodiment, the first default patterns may be dot array patterns or any arbitrary patterns, but the invention is not limited herein.

Returning to Step S230 of FIG. 2, the computing module 160 of FIG. 1 calculates to obtain an image blending relationship through the mapping relationships HL and HR and an overlapping area 180 (e.g. dash-line region of FIG. 1) of the projection regions 150_1-150_2. In the embodiment, the overlapping area 180 of the projection regions 150_1-150_2 in FIG. 1 may be obtained through approximate calculation by the computing module 160 using the locations of the projection regions 150_1-150_2 set in the control interface. In other embodiment, the overlapping area 180 may be obtained in Step S320 of FIG. 3 through approximate calculation using the first captured image obtained by the image capturing device 120.

The image blending relationship referred to in the embodiment may be the mapping look-up table in the blending device 130. In other words, after the computing module 160 calculates to obtain the image blending relationship LUT, the image blending relationship LUT is transmitted to the blending device 130. The blending device 130 receives the image blending relationship LUT transmitted from the computing module 160, so as to divide the desired image corresponding to the input video signal S1 into a plurality of desired sub-images. Each of the projection devices 110-1-110_2 respectively project a desired sub-image at the corresponding projection region according to the image blending relationship LUT, and the desired sub-images may be blended into the desired image corresponding to the input video signal S1. It should be noted that, the portion of the image blending relationship LUT is roughly calculated and obtained in Step S230, which is referred to as a first image blending relationship LUT1 herein. However, the computing module 160 would not necessarily require the overlapping area 180 to calculate the first image blending relationship LUT1, and would use the overlapping area 180 to further calculate a second image blending relationship LUT2 (the detailed will be mentioned below). In other words, in order to calculate/obtain the first image blending relationship LUT1 in the embodiment, the information for the overlapping area 180 may not be necessarily required, and the computing module 160 may use the mapping relationships HL and HR respectively corresponding to the projection devices 110_1-110_2 to calculate and obtain the first image blending relationship LUT1. Nevertheless, in some embodiment, the first image blending relationship LUT1 may also be calculated/obtained through the overlapping area 180, and thus the first image blending relationship LUT1 may be more accurate.

Figure 4:
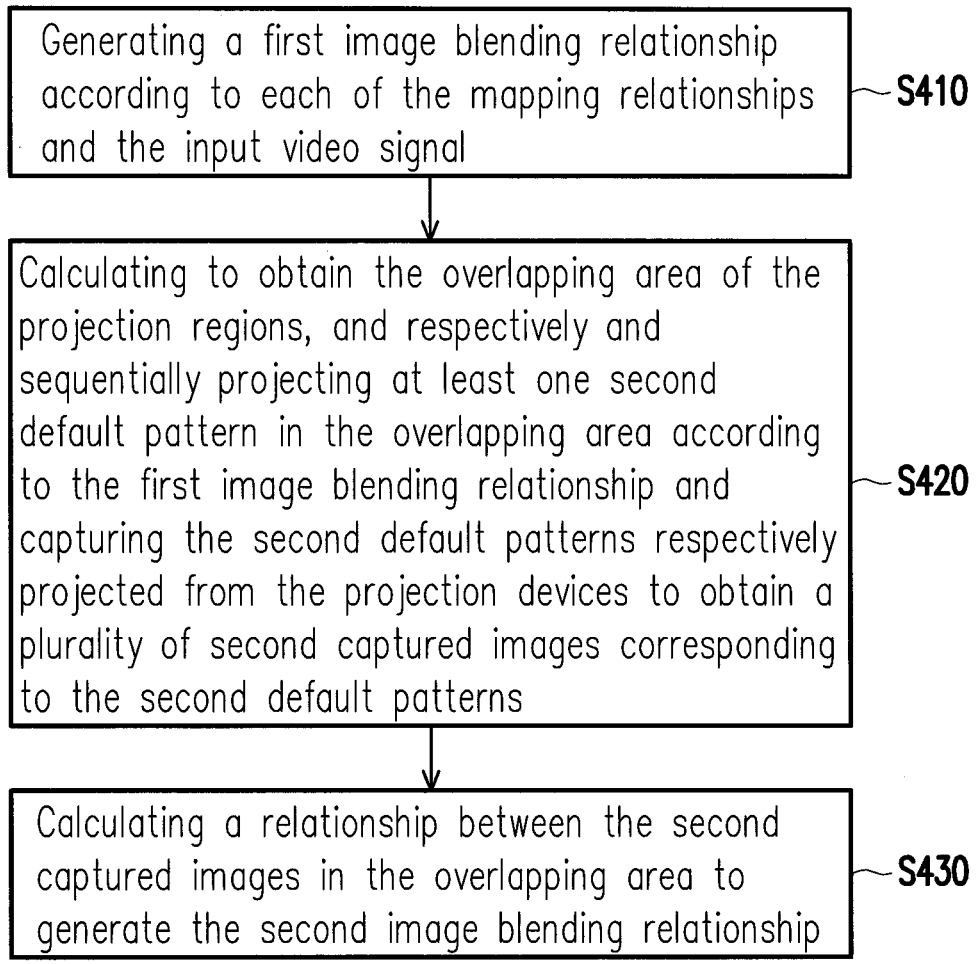
FIG. 4 is a detailed flow diagram of Step S230 in FIG. 2.

In the embodiment, the computing module 160 may further correct the approximate first image blending relationship LUT1 through the mapping relationships HL and HR and the overlapping area 180, and thereby obtain a accurate second image blending relationship LUT2. FIG. 4 is a detailed flow diagram of Step S230 in FIG. 2. With reference to FIG. 1 and FIG. 4, in Step S410, the computing module 160 generates a first image blending relationship LUT1 according to each of the mapping relationships HL and HR and the input signal S1. Moreover, the blending device 130 of FIG. 1 adjusts the images corresponding to the projection devices 110_1-110_2 according to the first image blending relationship LUT1. In Step S420 of the embodiment, the computing module 160 calculates to obtain the overlapping area 180 of the projection regions, and the computing module 160 controls each of the projection devices to respectively and sequentially project at least one second default pattern in the overlapping area 180 according to the first image blending relationship LUT1, and then the image capturing device 120 is used to capture the second default patterns respectively projected from the projection devices so that a plurality of second captured images corresponding to the second default patterns is obtained.

Figure 5A:
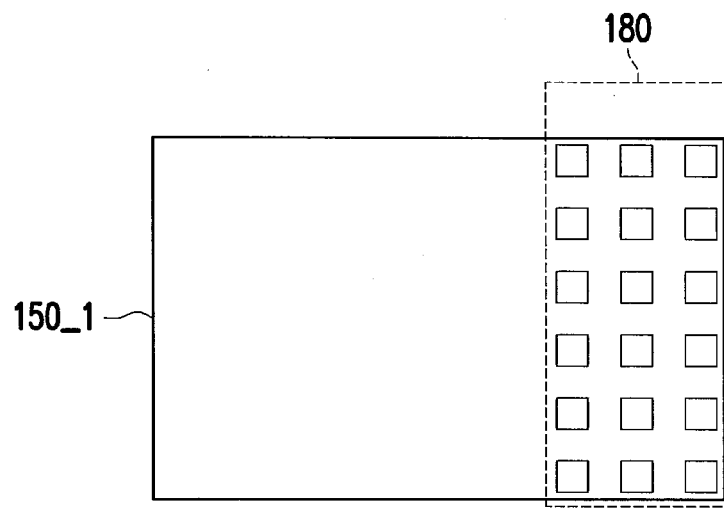
FIG. 5A and FIG. 5B are respective schematic views of the second default patterns projected in the overlapping area in different projection regions.
Figure 5B:
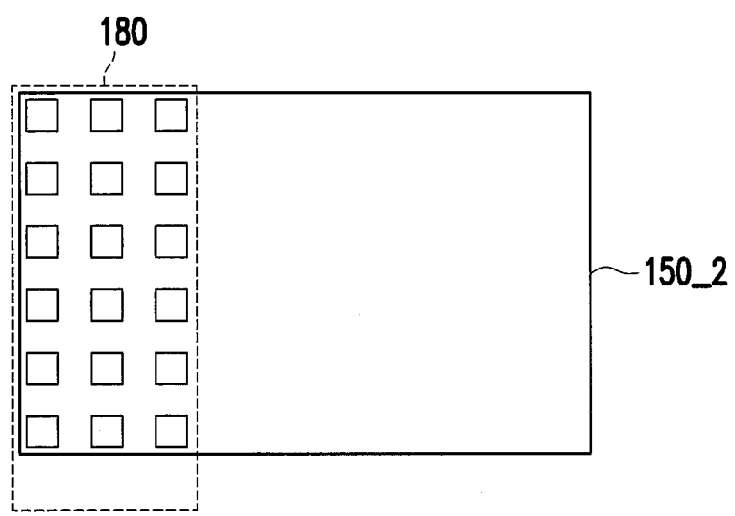

FIG. 5A and FIG. 5B are respective schematic views of the second default patterns projected in the overlapping area 180 in different projection regions 150_1 and 150_2. In FIG. 1 and FIG. 5A, the computing module 160 controls the projection device 110_1 on the left side through the blending device 130 to project the second default pattern (e.g. dot array pattern) in the overlapping area 180 in the projection region 150_1, so that the image capturing device 120 obtains the second captured image corresponding to the projection device 110_1. Similarly, in FIG. 1 and FIG. 5B, the computing module 160 controls the projection device 110_2 on the right side through the blending device 130 to project the second default pattern (e.g. dot array pattern) in the overlapping area 180 in the projection region 150_2, so that the image capturing device 120 obtains the second captured image corresponding to the projection device 110_2. With reference to Step S430 of FIG. 4, FIGS. 5A, and 5B, the two second captured images mentioned above both have the second default pattern, and the two second default patterns have a slight location difference therebetween. Therefore, the computing module 160 may calculate a misalignment relationship between the second captured images in the overlapping area 180 to correct the first image blending relationship LUT1, so as to generate the second image blending relationship LUT2. Moreover, the computing module 160 transmits the second image blending relationship LUT2 to the blending device 130. The blending device 130 uses the second image blending relationship LUT2 to divide the desired image corresponding to the input video signal S1 into a plurality of desired sub-images, and the signals respectively corresponding to the desired sub-images are respectively transmitted to the corresponding projection device. The desired sub-images may be blended into the desired image corresponding to the input video signal S1.

In other words, the image blending relationship LUT in embodiments of the invention has the approximate first image blending relationship LUT1 and the second image blending relationship LUT2 corrected by Steps S410-S430 of FIG. 4. The second image blending relationship LUT2 may be obtained from the first image blending relationship LUT1. The second image blending relationship LUT2 may further be obtained by using the overlapping area 180 of the projection regions 150_1-150_2 and Steps S410-S430 of FIG. 4.

In order to facilitate successful configuration of the image blending system 100, the computing module 160 may control the projection devices 110_1-110_2 to respectively project pure white patterns, and to control the image capturing device 120 to capture images. Accordingly, the user may view the images captured by the image capturing device 120 through the computing module 160, and thereby may confirm whether the configured locations between the image capturing device 120 and the projection devices 110_1-110_2 have been suitable.

In order for the image blending system 100 to automatically adjust the related optical parameters in the image capturing device 120 by using the computing module 160, the computing module 160 may control the projection devices 110_1-110_2 to respectively project images having different gray scales. The computing module 160 uses the images captured by the image capturing device 120 to determine whether the captured images are clear, and accordingly the brightness condition of the current environment may also be determined. The related optical parameters of the image capturing device 120 such as aperture, shutter or exposure may be accordingly adjusted using software.

On the other hand, in order for the desired image projected on the projection regions 150_1-150_2 to have the same brightness in each region, the computing module 160 may capture an image on the projection surface 140 through the image capturing device 120, so that the computing module 160 may calculate and obtain an overlapping brightness information corresponding to the overlapping area 180 through the captured image. Accordingly, the computing module 160 controls and adjusts the image brightness of the projection devices 110_1-110_2 through the overlapping brightness information, so that the desired images have uniform brightness.

In view of the foregoing, the image blending system and the image blending method in the embodiments of the invention may calculate and generate the image blending relationship through the image capturing coordinate system based on the resolution of the captured image captured by the camera and the input video coordinate system based on the resolution of the input video signal. The image blending relationship is used to project the desired image corresponding to the input video signal through multiple projectors. In some embodiment, the image blending system may further perform image blending correction by projecting default patterns in the overlapping area of the projection regions, so that the projected images of the overlapping area may be accurately blended.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

What is claimed is:

1. An image blending system, comprising:
    a plurality of projection devices, configured to project a desired image, and respectively configured for projection at a plurality of projection regions onto a projection surface, wherein the projection regions are partially overlapped to each other;
    an image capturing device, configured for image capturing from the projection surface, wherein a captured image from image capturing has an image capturing coordinate system based on a resolution of the captured image;
    a blending device coupled to the projection devices;
    a video input module, configured to transmit an input video signal corresponding to the desired image to the blending device, wherein the projection devices receive the input video signal transmitted from the blending device for projection, and the input video signal has an input video coordinate system based on a resolution of the input video signal; and
    a computing module, configured to calculate for obtaining a plurality of mapping relationships according to the image capturing coordinate system and the input video coordinate system, and for further obtaining an image blending relationship through the mapping relationships and an overlapping area of the projection regions, wherein the image blending relationship has a first image blending relationship and a second image blending relationship,
    wherein the computing module calculates to obtain the overlapping area of the projection regions, wherein each of the projection devices respectively and sequentially projects at least one second default pattern in the overlapping area according to the first image blending relationship, and the image capturing device captures the second default patterns respectively projected from the projection devices to obtain a plurality of second captured images corresponding to the second default patterns.

2. The image blending system as claimed in claim 1, wherein each of the projection devices is respectively configured to project a desired sub-image at the corresponding projection region according to the image blending relationship, and the desired sub-images are blended into the desired image.

3. The image blending system as claimed in claim 1, wherein the first image blending relationship is obtained through the mapping relationships and the input video signal, and the second image blending relationship is obtained through the first image blending relationship.

4. The image blending system as claimed in claim 1, wherein at least one of the first image blending relationship and the second image blending relationship is obtained through the overlapping area of the projection regions.

5. The image blending system as claimed in claim 1, wherein each of the projection devices respectively and sequentially projects at least one first default pattern in the corresponding projection region on the projection surface, and the image capturing device captures the first default patterns respectively projected from the projection devices to obtain a plurality of first captured images corresponding to the first default patterns.

6. The image blending system as claimed in claim 5, wherein the computing module calculates a relationship between the image capturing coordinate system and the input video coordinate system through the first default patterns and the first captured images to obtain the mapping relationships, wherein the mapping relationships are respectively related to the projection devices.

7. The image blending system as claimed in claim 1, wherein the blending device receives the image blending relationship transmitted from the computing module.

8. The image blending system as claimed in claim 3, wherein the computing module calculates a relationship between the second captured images in the overlapping area to generate the second image blending relationship, and transmits the second image blending relationship to the blending device, wherein the projection devices respectively project a plurality of desired sub-images according to the second image blending relationship transmitted from the blending device, and the desired sub-images are blended into the desired image.

9. The image blending system as claimed in claim 1, wherein the computing module includes a control interface, and the control interface is configured to set the resolution of the input video signal and location of each of the projection regions.

10. The image blending system as claimed in claim 1, wherein the computing module is further configured to calculate for obtaining overlapping brightness information corresponding to the overlapping area through the captured image, and the projection devices are further configured to project the desired image having uniform brightness through the overlapping brightness information.

11. A method for image blending, adapted to a plurality of projection devices for projecting a desired image at a plurality of projection regions on a projection surface, an image capturing device for image capturing from the projection surface, and a blending device for receiving an input video signal corresponding to the desired image, the method for image blending comprising:
    calculating for obtaining a plurality of mapping relationships according to an image capturing coordinate system and an input video coordinate system by a computing module, wherein the input video signal corresponding to the desired image has the input video coordinate system based on a resolution of the input video signal, and a captured image from image capturing has the image capturing coordinate system based on a resolution of the captured image; and
    calculating for obtaining an image blending relationship through the mapping relationships and an overlapping area of the projection regions by the computing module, wherein the image blending relationship has a first image blending relationship and a second image blending relationship,
    and wherein the step of obtaining the image blending relationship through the mapping relationships and the overlapping area of the projection regions comprising:
        calculating, by the computing module, to obtain the overlapping area of the projection regions;
        respectively and sequentially projecting, by each of the projection devices, at least one second default pattern in the overlapping area according to the first image blending relationship; and
        capturing, by the image capturing device, the second default patterns respectively projected from the projection devices to obtain a plurality of second captured images corresponding to the second default patterns.

12. The method for image blending as claimed in claim 11, further comprising:
    respectively projecting, by each of the projection devices, a desired sub-image at the corresponding projection region according to the image blending relationship, wherein the desired sub-images are blended into the desired image.

13. The method for image blending as claimed in claim 11, wherein the first image blending relationship is obtained through the mapping relationships and the input video signal, and the second image blending relationship is obtained through the first image blending relationship.

14. The method for image blending as claimed in claim 11, wherein at least one of the first image blending relationship and the second image blending relationship is obtained through the overlapping area of the projection regions.

15. The method for image blending as claimed in claim 11, wherein the step of obtaining the mapping relationships comprising:
   respectively and sequentially projecting, by each of the projection devices, at least one first default pattern in the corresponding projection region on the projection surface; and
   capturing, by the image capturing device, the first default patterns respectively projected from the projection devices to obtain a plurality of first captured images corresponding to the first default patterns.

16. The method for image blending as claimed in claim 15, wherein the step of obtaining the mapping relationships further comprising:
   calculating, by the computing module, a relationship between the image capturing coordinate system and the input video coordinate system through the first default patterns and the first captured images to obtain the mapping relationships, wherein the mapping relationships are respectively related to the projection devices.

17. The method for image blending as claimed in claim 13, wherein the step of obtaining the image blending relationship through the mapping relationships and the overlapping area of the projection regions further comprising:
   calculating, by the computing module, a relationship between the second captured images in the overlapping area to generate the second image blending relationship.

18. The method for image blending as claimed in claim 17, further comprising:
   respectively projecting, by the projection devices, a plurality of desired sub-images according to the second image blending relationship, wherein the desired sub-images are blended into the desired image.

19. The method for image blending as claimed in claim 11, wherein the step of obtaining the input video signal comprising:
   setting the resolution of the input video signal and location of each of the projection regions by a control interface.

20. The method for image blending as claimed in claim 11, further comprising:
   calculating, by the computing module, for obtaining overlapping brightness information corresponding to the overlapping area through the captured image; and
   projecting, by the projection devices, the desired image having unifoim brightness through the overlapping brightness information.

* * * * *